(12) United States Patent
Chowdbary et al.

(10) Patent No.: US 7,475,080 B2
(45) Date of Patent: Jan. 6, 2009

(54) ADAPTIVE DATA WAREHOUSE META MODEL METHOD

(75) Inventors: Pawan R. Chowdbary, Croton-On-Hudson, NY (US); Jun-Jang Jeng, Armonk, NY (US); Shubir Kapoor, Shrub Oak, NY (US); Juhnyoung Lee, Yorktown Heights, NY (US); Josef Schiefer, Vienna (AT)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/994,232

(22) Filed: Nov. 23, 2004

(65) Prior Publication Data

US 2006/0112109 A1 May 25, 2006

(51) Int. Cl.
*G06F 7/00* (2006.01)
(52) U.S. Cl. ...................................... 707/100; 707/101
(58) Field of Classification Search ................. 707/100, 707/101
See application file for complete search history.

(56) References Cited

U.S. PATENT DOCUMENTS 6,999,963 B1 * 2/2006 McConnell ................. 707/100

2002/0133368 A1 * 9/2002 Strutt et al. ................... 705/1

OTHER PUBLICATIONS

Charles Thomas Betz, "The convergence of metadata and IT service management" pp. 5-65 Jun. 28, 2003.
Ruben Lara; Jos de Bruijn, "Ontology-based transformations in the COG project" Information Society Technologies, pp. 1-42.

* cited by examiner

*Primary Examiner*—Christian P. Chace
*Assistant Examiner*—Kellye Anderson
(74) *Attorney, Agent, or Firm*—Whitham Curtis Christofferson & Cook, PC; Stephen C. Kaufman (57) ABSTRACT

A hybrid approach for capturing meta data about Business Processing Monitoring (BPM) artifacts is based on a combination of a relational meta data model and a semantic net. Meta data about metrics and situations and their dimensional context are first captured in the method. Then, relational meta data are used to describe a generic data schema for metrics, situations and their dimensional context. The meta data from semantic nets are used to extend the meta data definitions. Data from a data warehouse are searched and managed with the schema described and managed with the relational and semantic net meta data.

3 Claims, 6 Drawing Sheets

Configure Data
Staging & Data
Mgmt Components
230

ADAPTIVE DATA WAREHOUSE META MODEL METHOD

BACKGROUND OF THE INVENTION

1. Field of the Invention

The present invention generally relates to data mining technologies and, more particularly, to a Data Warehouse Meta model which is a combination of a relational meta model and semantic net.

2. Background Description

Businesses are getting more event-driven and adaptive in nature. They are exposed to large amounts of data every day. For Sense and Respond and Business Process Monitoring (BPM), this data needs to be transformed and stored in a database for analysis purposes. Traditional data warehouse schemas are designed, in general, independent from the business process and source data. For a data warehouse to become adaptive and closely integrated with the operational environment, it has to be sensitive to changes in the business environment. Data schemas of traditional data warehouse solutions are generally not designed to capture sufficient meta data about relationships between the data in the warehouse environment and business process data.

For a business to analyze the data from various perspectives, it is very important that data dimensions have a rich set of attributes that allow defining new relationships between facts and viewing these facts from various perspectives. For example, a dimension geography or product on its own does not provide much information from a business point of view. A business user would like to associate the dimensions with attributes such as geography with region, country, state, city, etc.

In case of the product dimension, a user might want to divide the product further into product category and sub categories, such as the category "shoes", which could be further sub-divided into sub-categories of "men's shoes" or "ladies' shoes".

Complex hierarchical relationships are difficult to capture with relational models. For relational models, assumptions have to be made how hierarchical relationships are mapped to database tables. Also, querying hierarchical meta data from a relational database can become very cumbersome and requires detailed knowledge on the underlying schemas for storing the meta data. Also making changes in hierarchical relationships requires complex database operations and updates to the meta model.

On the other hand, semantic nets can describe very well such hierarchical relationships. It is the nature of a semantic net to capture graphs and hierarchies. Semantic nets provide powerful mechanisms to express complex data relationships that can be found in many businesses. Lack of semantically rich queries to link data from a data warehouse with business processes requires significant amounts of programming and integration work today. The next generation data warehouses are getting more "real time" in nature. Hence, the data warehouse will be more integrated with the operational environment and, therefore, it requires more semantic information about the business environment for the integration and to be adaptive to changes.

The deficiencies of current technologies can be summarized as follows:

Lack of meta models to capture information about operational entities, the Business Process Monitoring (BPM) artifacts such as metrics, metric contexts and their relation with data warehouse concepts such as facts and dimension.

Lack of additional meta data that are required to describe the entities of operational source systems and link them to the data of the data warehouse environment.

There is no systematic approach to map and bind entities of the operational source system or BPM artifacts to a data warehouse schema.

Traditional data warehouse solutions require experts to define data schemas which do not allow the capture of rich semantic information.

Current data models and components of data warehouses are difficult to re-use among multiple projects.

Current data warehouses are not adaptive in nature, neither do they support any meta model to make them sensitive to the change. This makes data warehouses very rigid and inflexible with adaptive business processes.

New data warehouse schemas and components have to be created from scratch for new business problems. It is difficult to reuse meta data about data schemas, components and business data.

SUMMARY OF THE INVENTION

An exemplary object of the present invention is to provide a hybrid approach which supplements the relational meta model with additional meta data for contextual information that is defined in a semantic net. The relational meta model and the semantic net are very flexible in continuously adapting meta data as the businesses change. The relational meta model defines relationships that are common for Business Process Monitoring (BPM), such as relationships between measurable goals (metrics) and its context. The business process monitoring model artifacts can be transformed into a Data Warehouse meta model using transformations. In order words, there exists a mapping between the meta model for business process monitoring and the meta model for the data warehouse. The relational meta model allows a star schema for the data warehouse to be automatically generated. Meta data from the semantic net further enables the generation of other complex downstream artifacts such as OLAP (Online Analytical Processing) cube definitions. According to the invention, the Warehouse Meta model uses a hybrid approach for capturing meta data for managing business performance management (BPM) data. The meta data is used in the method to automatically build the schemas for the data warehouse and other downstream models (e.g., OLAP cubes) and/or solution components (e.g., data access/query components).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

Figure 1:
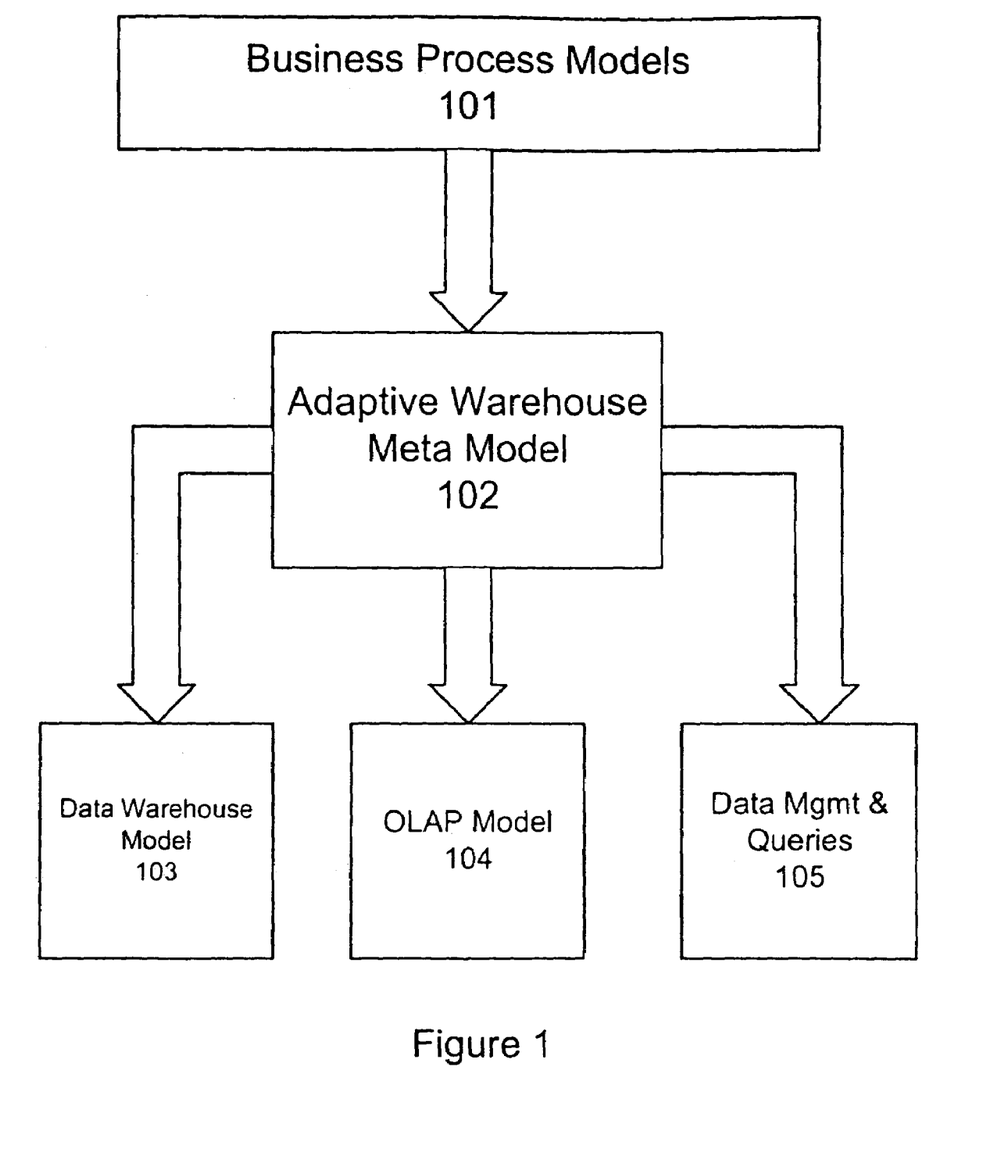
FIG. 1 is a block diagram illustrating the Adaptive Warehouse model according to the invention.

Business processes can change over time. Therefore, it is crucial that the data warehouse environment also adapts to these changes. Traditional data warehouse systems are built with the assumption that the data structure of business transaction does not change frequently. Referring now to the drawings, and more particularly to FIG. 1, there is shown a block diagram of the Adaptive Warehouse model according to the invention, which includes a computer implemented method, systems for performing the method, and software or firmware containing instruction sets for performing the method. The Adaptive Warehouse Meta Model 102 does not make the assumption that transaction data is static. Instead, the Adaptive Warehouse Meta Model 102 ensures that the data warehouse environment properly reflects the artifacts of business processes monitored with the business process models 101 such as Business Observation Model (BOM). The Adaptive Warehouse Meta Model 102 along with data management component 105 allows the automatic updating of the data schemas in the data warehouse and the configuration of the data staging environment such as adapting the data propagation logic according to changes in the business process.

The most crucial information in data warehouses is the relationships between data. The usage of meta data from semantic networks significantly expands the value of data in the data warehouse environment by adding new (potentially inferred) relationships between data entities, or increasing the context information on existing data relationships. The invention uses a meta data model that consists of relational meta data and meta data from a semantic network that describes operational entities, BPM artifacts such as metrics and situations, and data in the data warehouse and the relationship between these data. The meta data model drives the automation of programs that are commonly required for the preparation and aggregation of metrics, or situational data. The meta data model is used to populate the OLAP model 104 for multidimensional analysis. The meta data model also captures schema information about existing data warehouses or extensions to the data warehouse model 103. The meta data model, in conjunction with the semantic net, drives the automation of data management and queries 105 that can link the data warehouse data with the business process artifacts.

Figure 2:
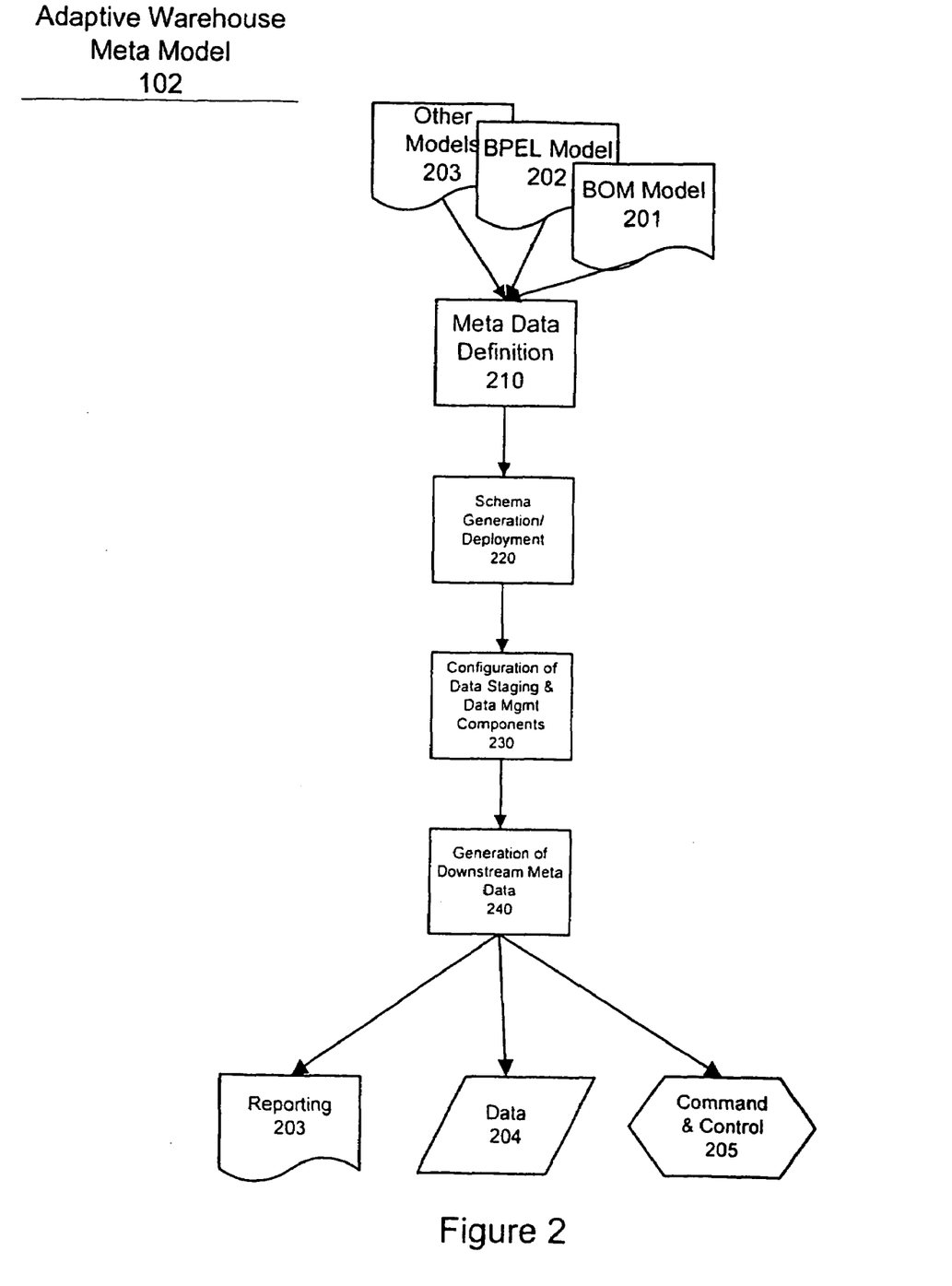
FIG. 2 is a block diagram illustrating the elements within the Adaptive Warehouse model according to the invention.

The process for using the Adaptive Warehouse Meta Model 102 as shown in FIG. 2 includes the following elements: Meta Data Definition 210, Schema Generation and Deployment 220, Configuration of Data Staging and Data Management Components 230 and Generation of Downstream Meta Data 240. The meta data definition 210 uses inputs from the business models (e.g., BOM Model 201, BPEL Model 202, and other models 203) to define and/or compose the meta data for data warehouse in the form of schema (i.e., structure data). It is the schema generation/deployment 220 element that creates the structured data and relationships from the meta data definition 220.

Thus, the adaptive warehouse meta model 102 would provide a meta data definition 210 (e.g., climate relative to store location, historical seasonal purchase information, etc,), the schema generation/deployment 220 would generate data tables (star scheme) that could link the hierarchical semantic data to the defined meta data. Once the relationships between the defined meta data and the hierarchical semantic data has been established, the adaptive warehouse meta model 102 performs configuration of data staging and data management components 230 for the data propagation from business process models and data management (upstream). That is, it collects, correlates and configures the data with its relationships back into the relational meta database so that the information can propagate into the generated start scheme. Finally, the adaptive warehouse meta model 102 allows the generation of downstream meta data 240 so as to configure tools and applications that can use the relational meta data (downstream), such as OLAP or data mining tools.

Meta Data Definition/Composition

Figure 3:
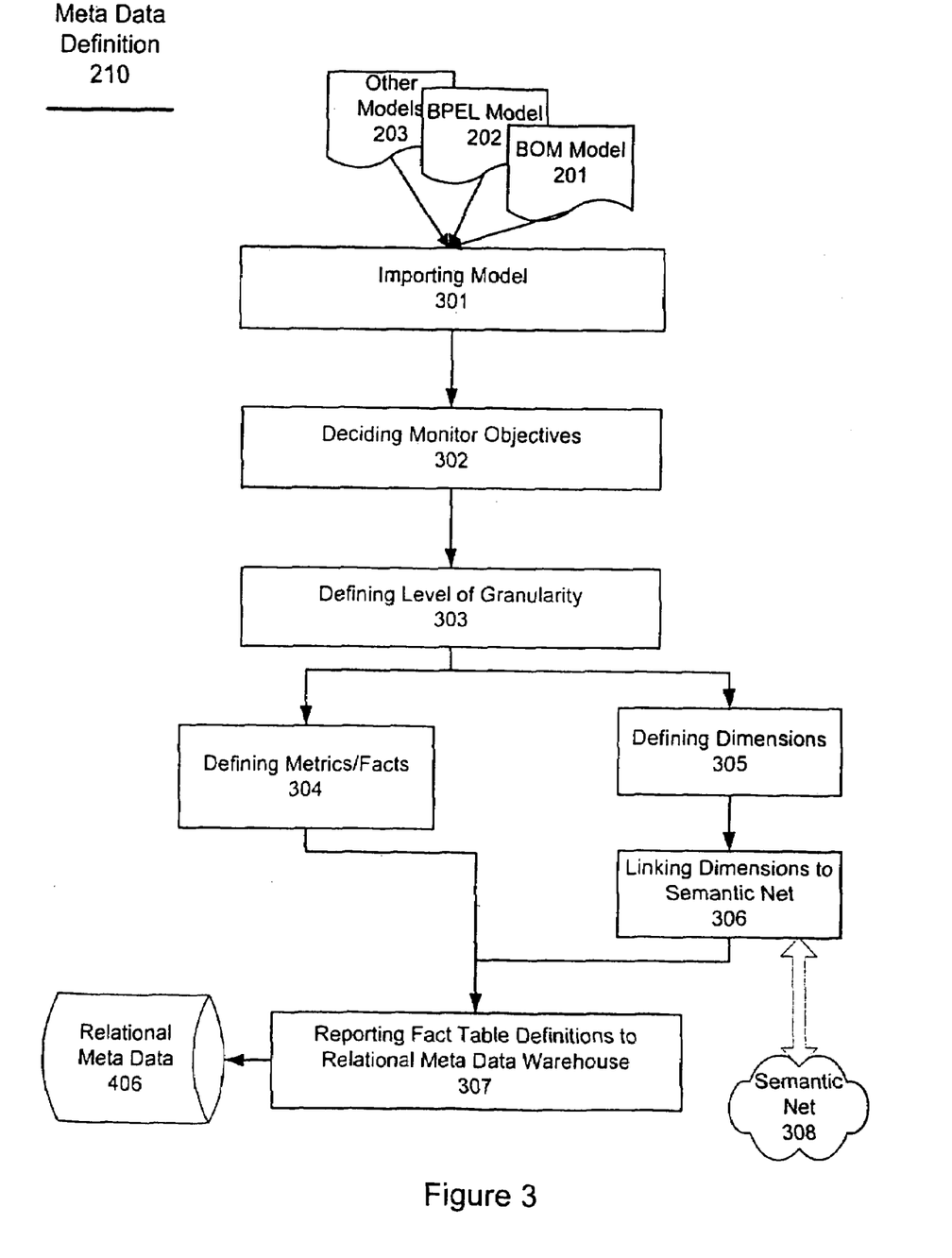
FIG. 3 is a block diagram illustrating the meta data definition

In this stage, illustrated in FIG. 3, the meta data definitions for the data warehouse are composed by the meta data definition 210 element. The meta data is derived from the business models (e.g., BOM model 201, BPEL model 202 or other process related models 203). The process begins with the importation of the specific business model at 301. Next, at 302 monitoring objectives (e.g., identifying metrics dimensions and metrics to dimensions relationship artifacts, etc.) are determined. This is done by selecting the parts and aspects of the process that should be monitored and analyzed. The level of granularity, i.e., the level of detail for the monitoring and analysis, is defined at 303. At this point, the process splits into two paths. The first generates the metric fact definitions at 304. The second path first generates the dimension definitions at 305 and, at 306, links the definitions to the semantic net 308; e.g., captured in Resource Description Framework (RDF). Finally, fact table definitions are reported at 307 in to the relational meta data base 406. This relational meta data base contains the correlated data definitions with the specific semantic hierarchical data.

For example, take the case of a national retail store, called BIG STORE. BIG STORE is a discount retailer of clothing and housewares. A basic business model is used to support the buyer functions and allocation of merchandise to the stores located across several geographic areas. The adaptive warehouse meta model 102 of the invention could allow the retailer to capture specific details about refining their existing buyer and ordering process and analyzing the data captured in the generated star scheme database could enable the retailer to expand into new markets within certain geographies.

Assuming BIG STORE has traditionally purchased winter snow boats for sale in their stores throughout the country, it is reasonable to assume that stores in California, Florida and Arizona have less of a demand for snow boats than stores in Massachusetts, Montana, and Upstate New York. BIG STORE has not provided snow boats to their stores located in Florida but has sent some boats to Arizona and these boots have sold. The adaptive warehouse meta model 102 allows BIG STORE to relate various business model inputs with semantic net data to determine what factors affect the sale of snow boots in Arizona (e.g., geographic location, season, etc.) Looking at the Meta Data Definition 210 process with this example, the inventor control business model would be imported at 301. From the business model, the meta data definition 210 would identify the monitor object at 302 as when are snow boots sold. The level of granularity at 303 would possibly include: season (e.g., month, day, etc.), what climate (e.g., tropical, temperate, etc.) environmental conditions (e.g., average temperature, average, precipitation, etc.), geographic characteristics (e.g., mountains, seacoast, etc.) were present at times of snow boot sales, other products were purchased along with the snow boats (e.g., ski jackets, garden tools, etc.) and economic factors (e.g., average income, educational levels, average home prices, etc). The model would define the metrics and facts at 304 that are to be analyzed based on the specific dimension defined at 305 (e.g., name brand boots verses store brand boots, etc.) at 304, and using the semantic net data made available at 306, the meta data definition 210 would create a fact/dimension table similar to Table 1 below. The fact/dimension tables would be populated with the actual values (e.g., quantitative, rank, priority, etc.) and report this table at 307 to the relational meta data base 406.

The deliverable data of this stage is a complete set of meta data that allows the generation of the Data Definition Language (DDL) for constructing the data warehouse. The meta data describes the fact tables, dimension tables and links the dimensions with a semantic net. The semantic net is used to describe meta data that is difficult to manage with relational databases, such as hierarchies (e.g., hierarchies for dimensions of OLAP cubes).

TABLE 1

Fact/Dimension Table Example for BIG STORE

| Monitor Objective - | Dimension - Name Brand | Dimension - Store |
|---|---|---|
| Season | Month | Month |
| | Day | Day |
| | Year | Year |
| Climate | Temperate | Temperate |
| | Tropical | Tropical |
| | Semi-tropical | Semi-tropical |
| Environmental | AVG Temp | AVG Temp |
| | AVG Rain Fall | AVG Rain Fall |
| | AVG Snow Fall | AVG Snow Fall |
| | AVG Humidity | AVG Humidity |
| Geographic | Mountain | Mountain |
| | Coastal | Coastal |
| | Desert | Desert |
| Related Purchases | Purchase of Ski Jackets | Purchase of Ski |
| | AVG House Price | AVG House Price |
| | Education Level | Education Level |

Data Schema Generation/Deployment

Figure 4:
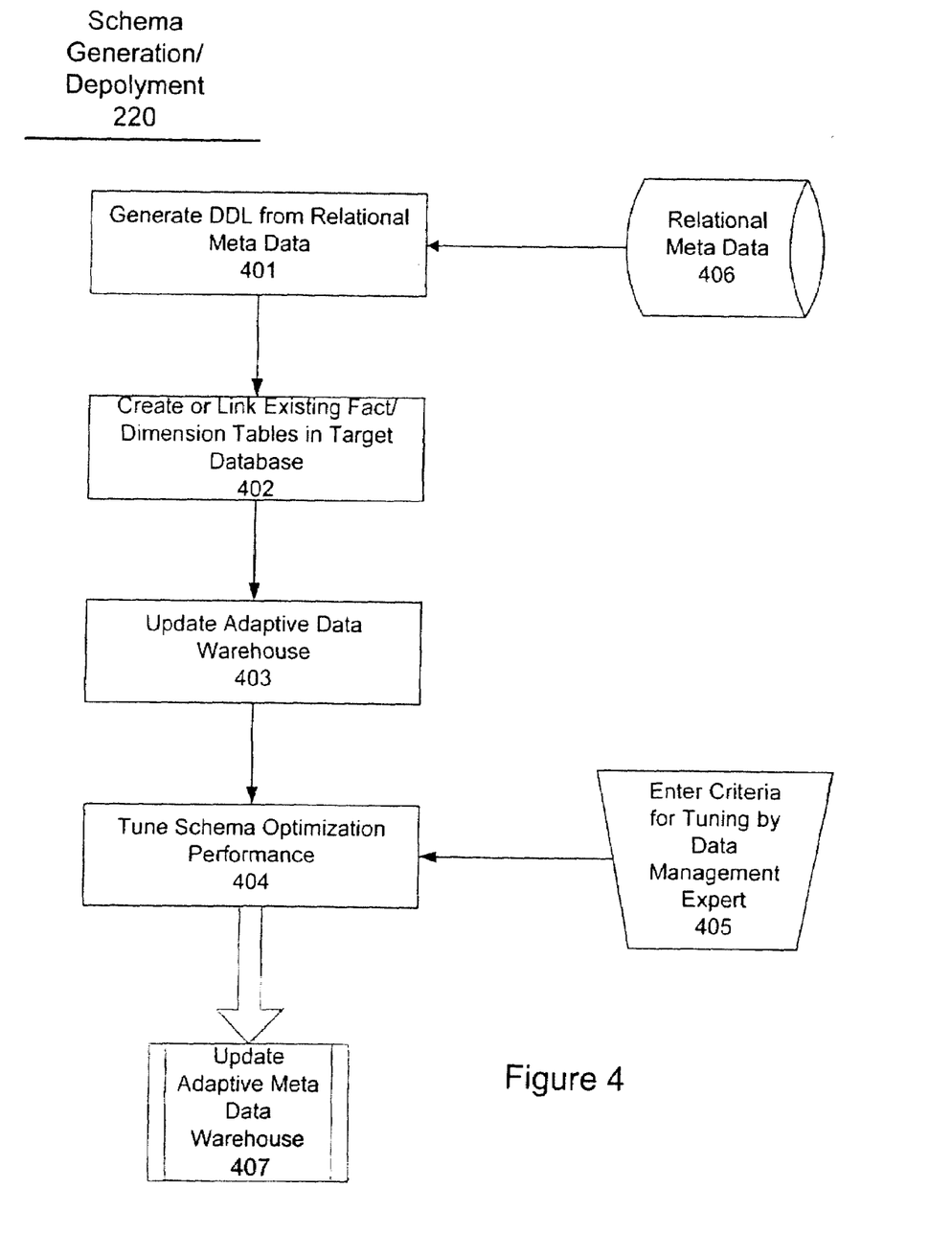
FIG. 4 is a block diagram illustrating the schema generation and deployment.

At this point, the meta data is available in a reporting format that is compatible with the adaptive meta data warehouse 407. The schema generation/deployment 220 element transforms the data format to be useable by the target databases. The transformation steps are shown in FIG. 4.

The relational meta data from 406 is used to automatically generate a DDL (Data Definition Language) at 401 for the data warehouse. The DDL can be used to create tables in the target databases at 402. After creating the tables, it can be further optimized and tuned (e.g., creating indices) by data management experts. The meta data can capture the definitions of existing table 402 and could re-use the tables as such or form new tables and load the data by using data staging and data management component. The use of the DDL for transforming the meta data eliminates this import/export type of function. Once the linking to the target database is done at 402, the adaptive data warehouse is update at 403 to include those attributes that have been created or added as part of the translation. The tables are then optimized for the target database at 404. This may include stripping the data of incompatible fields or commands that impact the performance of the target database when using the fact/dimension tables. The criteria for tuning the translated data can be entered by a data management expert at 405. Finally, the adaptive data warehouse is again updated with the tuned tables at 407.

Configuring Data Staging/Data Management Components

Figure 5:
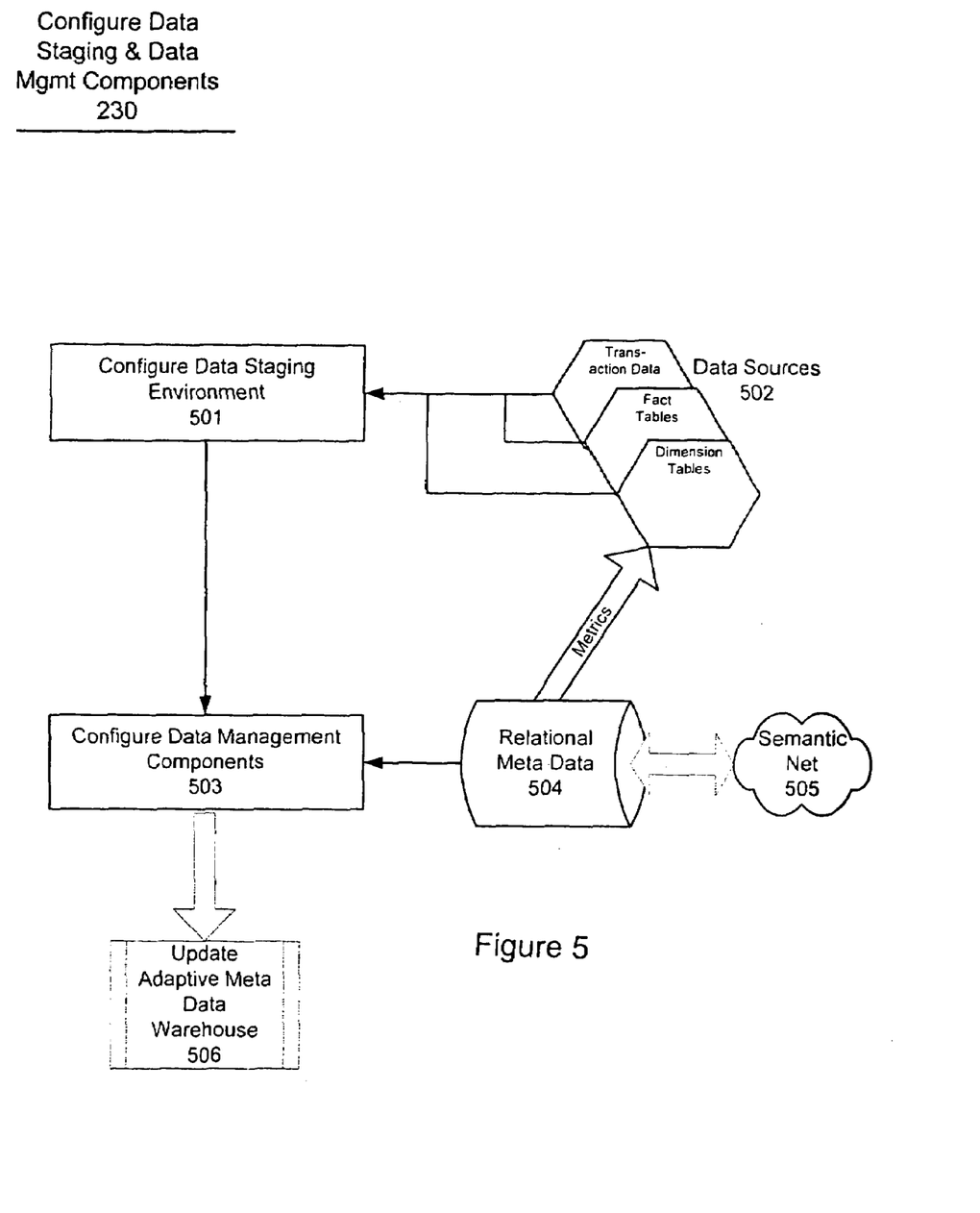
FIG. 5 is a block diagram illustrating the configuration of the data staging environment and data management components.

FIG. 5 shows the configuration of data staging elements for staging the data for ETL purposes. That is, once the meta data tables have been created an instruction set is generated at 501 which allows data to be pulled from the data sources 502. In addition, API's are written to exchange data with the adaptive data warehouse at 503. These API's use information from the relational meta data database 504 to generate the APIs so that operational data can not be corrupted in the data warehouse through direct access. The relational meta data database 504 continues to communicate with the semantic net to exchange data and metrics for the data sources 502 and as an input for configuring the data management components at 503.

In terms of our example with BIG STORE, this would be the downstream access of the compiled meta data for queries that might include new store location criteria using historical and demo-graphical data compiled in the adaptive data warehouse. Accessing this data could be through a query type API to prevent overwriting of the meta data with theoretical assessment data.

Figure 6:
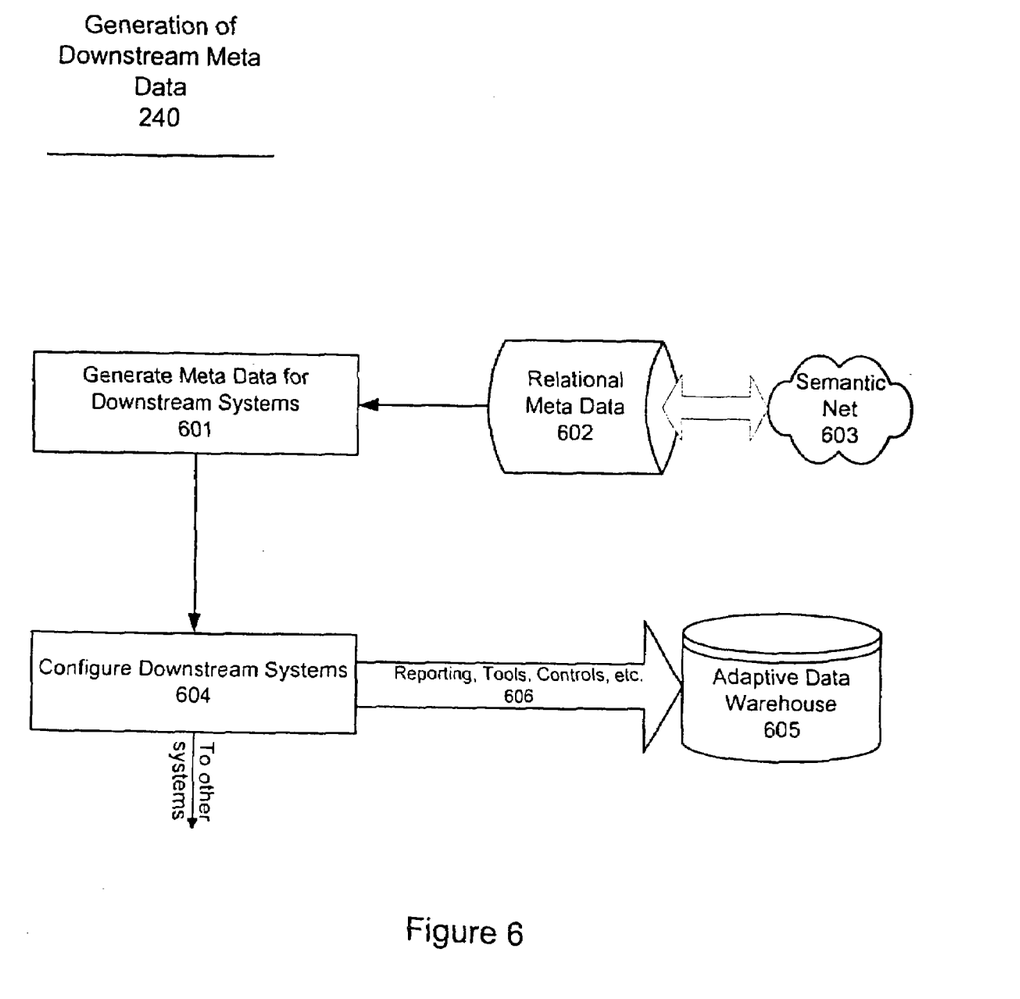
FIG. 6 is a block diagram illustrating the generation and configuration of downstream artifacts and components.

Generation of Downstream Meta Data, Configuration of Data Warehousing Tools and Application Finally, as shown in FIG. 6, additional meta data is generated for downstream systems at 601. Again, the generation of this data is based on information in the adaptive data warehouse, relational meta data 602 and semantic net 603 data. In addition, command and control instructions are generated at 608 to be sent with the meta data so as to allow configuration of the downstream systems to use the available data. Once this is released from the adaptive meta data warehouse at 604, the adaptive data warehouse 605 is again updated with reporting, tools, controls, etc. 606.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for capturing meta data about business transactions represented by given business process models having Business Performance Management (BPM) artifacts, data schema, and mapping information, and storing the meta data in adaptive meta data warehouse according to a schema in relation to a given semantic net, comprising:
   generating a relational meta data base definition, said generating including
      providing a business process model having meta data definitions,
      importing the business process model into a meta data warehouse,
      providing a predetermined monitoring objective,
      providing a predetermined level of monitoring granularity,
      generating a definition of meta data metrics/facts, based on the predetermined monitoring objective and the predetermined level of granularity, generating a definition of meta data dimensions, based on the predetermined monitoring objective and the predetermined level of granularity, linking the generated definition of meta data dimensions to the given semantic net, constructing the fact table based on said generated definition of meta data metric/facts and on a result of said linking, and constructing the relational meta data base definition, having said fact table;

generating a relational meta data schema for constructing an adaptive meta data warehouse, said generating including generating a data definition language (DDL) based on said relational meta data base, constructing a target database having relational tables, based on said DDL and said fact table of said relational meta database, updating the adaptive meta data warehouse to include the relational tables of said target database, optimizing the relational tables included in the adaptive meta data warehouse based on a given tuning criteria, updating the adaptive meta data warehouse based on said optimizing;

configuring a data staging and a data management component of a computer model, based on said relational meta data base said given semantic net, said configuring including forming an instruction set for pulling data from a plurality of data sources, said plurality including tables from said relational meta data base and a given transaction data, and updating the adaptive meta data warehouse based the pulled data;

generating a downstream meta data, based on said relational meta data base, and said given semantic net; and generating a reporting data based on said generated downstream meta data.

2. The method of claim 1, further comprising inputting said reporting data to a business process model.

3. The method of claim 1, further comprising searching said adaptive meta data warehouse, based on said relational meta data base.

* * * * *